Dec. 24, 1929.　　　B. F. KURTZ　　　1,740,545
EMPTY AND LOAD BRAKE
Filed Sept. 4, 1926　　　3 Sheets-Sheet 1

WITNESS
William Dinning.

INVENTOR
Benjamin F. Kurtz
by _____
Attorney.

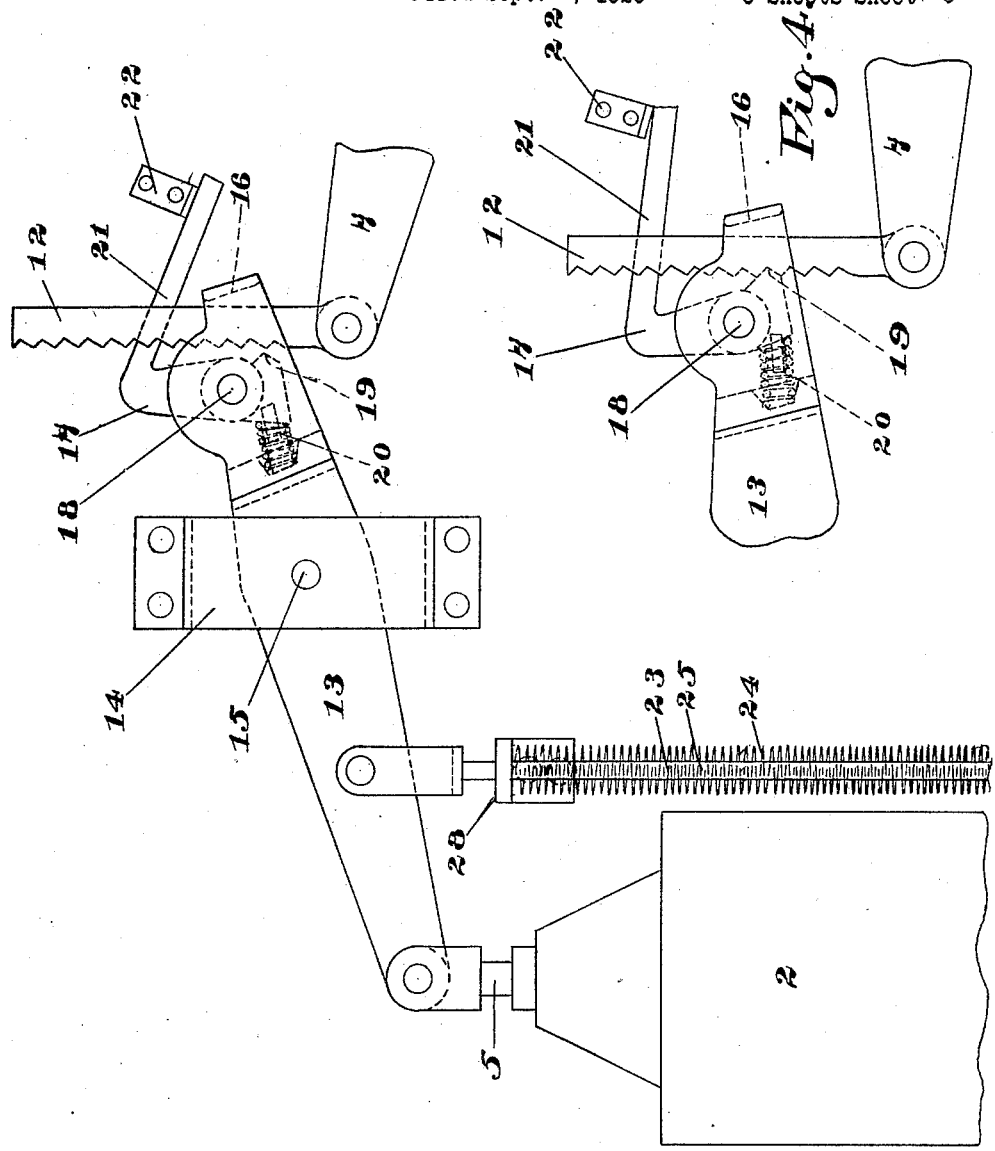

Patented Dec. 24, 1929

1,740,545

UNITED STATES PATENT OFFICE

BENJAMIN F. KURTZ, OF BELLEVUE, PENNSYLVANIA, ASSIGNOR TO PRESSED STEEL CAR COMPANY, OF PITTSBURGH, PENNSYLVANIA, A CORPORATION OF NEW JERSEY

EMPTY AND LOAD BRAKE

Application filed September 4, 1926. Serial No. 133,574.

An object of the invention is to provide an empty and load brake for railway cars, which is simple in construction and efficient in operation.

Another object of the invention is to provide an empty and load brake having a plurality of levers which, when the brake is in released condition or when an empty application of the brake is being made, are in disconnected relation with each other, and which, when a load application of the brake is being made, are in operative engagement with each other.

A further object of the invention is to provide an empty and load brake which will take up a minimum amount of space longitudinally of the car, thus rendering it easy to mount the brake beneath the sloping floor of a hopper car or an ore car.

These and other objects will be apparent from the following description.

Figure 1:
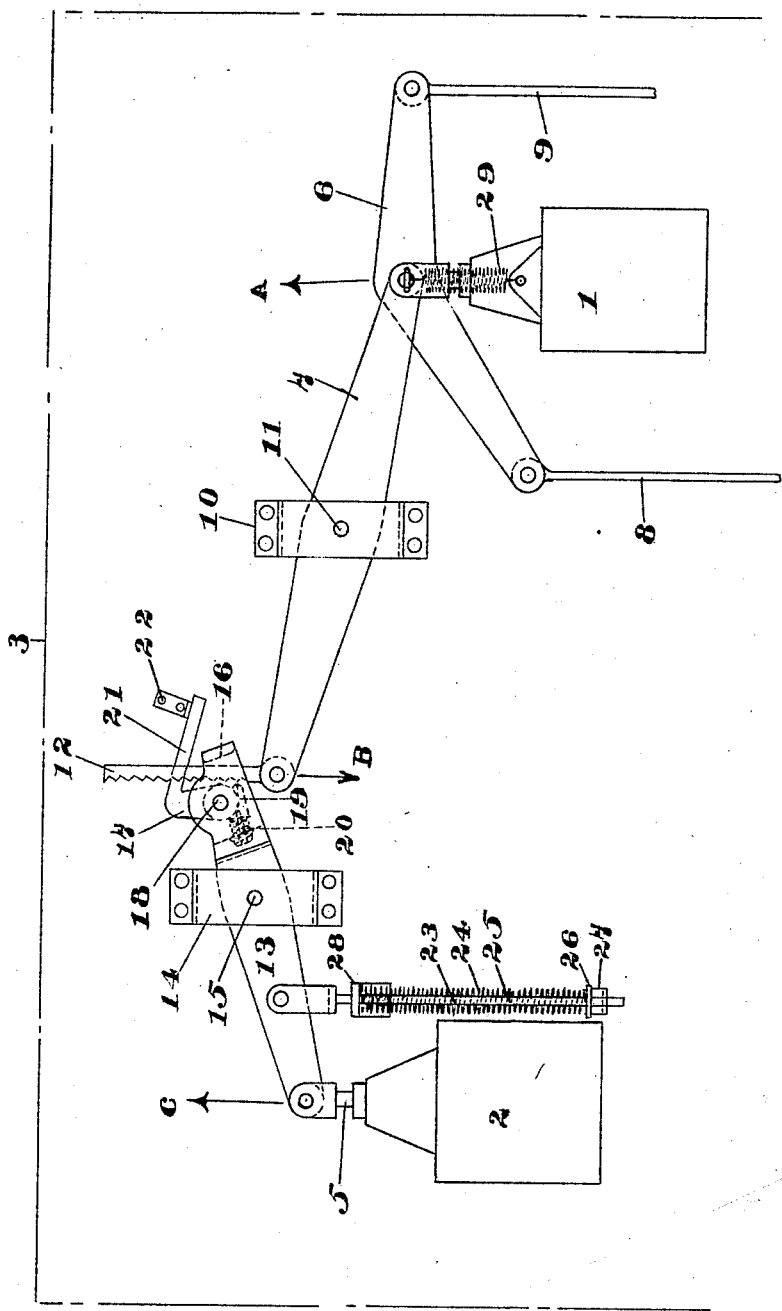
Figure 2:
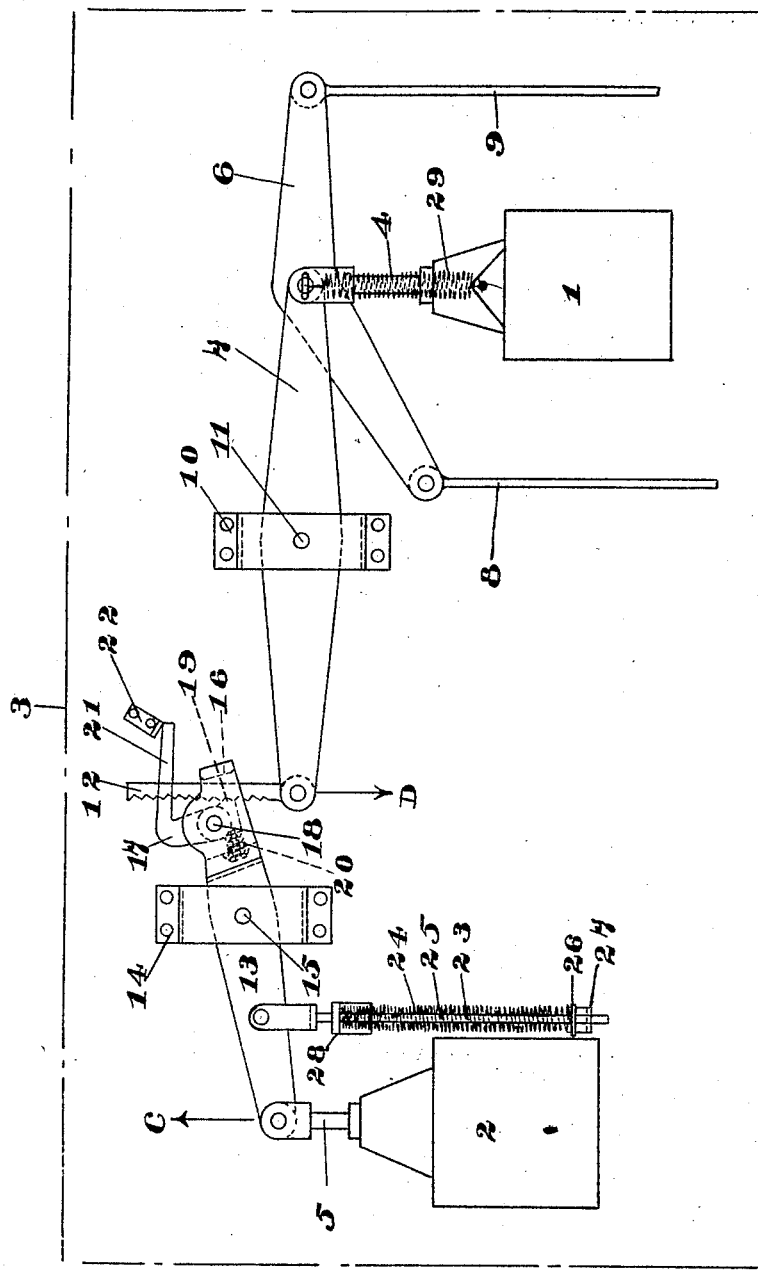

Referring to the drawings in which like reference characters refer to like parts, Fig. 1 is a plan view of a portion of an empty and load brake with the invention embodied therein, the several parts of the invention being shown in their released positions; Fig. 2 is a like view showing the several parts of the mechanism in their proper positions when a load application of the brake is being made; Fig. 3 is an enlarged detail plan view showing the levers in disconnected relation with each other, and Fig. 4 is a like view showing the levers connected with each other.

Referring now in detail to the drawings the reference character 1 indicates an empty brake cylinder and 2 indicates a load brake cylinder, both of which cylinders are suitably attached to a car body 3, a portion of which body is shown in outline by dot and dash lines in Figs. 1 and 2. These cylinders are provided with the usual pistons (not shown) and piston rods, the piston rod of the empty brake cylinder being indicated by the reference character 4 and the piston rod of the load brake cylinder by the reference character 5. The outer end portion of the piston rod 4 is pivotally connected with a lever 6 at a point intermediate the ends of such lever and is further pivotally connected with one end of a lever 7. The lever 6 at its ends has connected therewith rods 8 and 9 for transmitting the braking forces to the usual truck brake levers (not shown). The lever 7, intermediate its ends is fulcrumed to the car through the medium of a bracket 10 and pin 11, such bracket being secured to the car. One end of this lever, as hereinbefore mentioned, is connected with the piston rod 4 and the other end has mounted thereon a toothed member 12.

The outer end portion of the piston rod 5 is operatively connected with one end of a lever 13, such lever intermediate its ends being fulcrumed through the medium of a bracket 14 and pin 15, such bracket being secured to the car. The other end of this lever 13 is provided with an opening 16 through which a portion of the toothed member 12 passes. Within this opening one end of a member 17 is loosely connected with the lever 13 through the medium of a pin 18. Within the opening 16 the member 17 is provided with a projection or tooth 19 which is adapted to engage the teeth of the member 12. Between the member 17 and the lever 13 and seated upon both within the opening 16, there is a resilient member 20 which tends to force the member 17 in a direction so that the tooth 19 thereof will engage the toothed member 12. This member 17 has an arm 21 which extends some distance beyond the end of the lever 13, the outer end of such arm being adapted to engage a stop 22 secured to the car. When the arm 21 engages with the stop 22 the tooth 19 will be moved out of engagement with the member 12, so that relative movement between this member 12 and the lever 13 is permitted.

For the purpose of controlling the fluid pressure to the brake cylinders any usual change over valve (not shown) may be used.

For the purpose of moving the piston, piston rod 5 and lever 13 to their released positions, a device 23 is provided which comprises a spring 24 mounted on a rod 25 such rod at one end being connected with the lever 13 at one side of its fulcrum. The rod 25 extends through the spring 24 and at its outer end is provided with a washer 26 which is held in place by a nut 27. The washer 26 forms a seat for one end of the spring while the opposite end of the spring seats against a stop or bracket 28 secured to the car.

For the purpose of moving the piston, piston rod 4, levers 6 and 7 and rods 8 and 9 to their released positions a spring 29 is provided, one end of which is attached to the cylinder 1 or any suitable rigid part of the car and the other end of which is secured to the pin which connects the piston rod 4 and levers 6 and 7.

Assuming a car, equipped with the invention, to be empty and the change over valve set for an empty application of the brake and the several parts of the invention to be in their released positions, as shown in Fig. 1 of the drawings, and the brake is to be applied, the operations of the several parts are as follows:—The fluid pressure enters the cylinder 1 and forces the piston rod 4, lever 6, and one end of the lever 7 in the direction of the arrow A in Fig. 1, which causes the toothed member 12 to move in the direction of the arrow B in Fig. 1, all of the foregoing parts moving a sufficient distance to apply the brakes. It will here be noted that when an empty application is made the tooth 19 on the member 17 mounted in the lever 13 is out of engagement with the toothed member 12 so that the lever 13 and piston rod 5 are not moved in either the applying or releasing of the brakes.

When the fluid pressure is released from the cylinder 1, the spring 29, which has been tensioned during the brake applying operation, will force the piston, piston rod 4, levers 6 and 7, as well as the rods 8 and 9 to their released positions, as shown in Fig. 1.

Assuming a car, equipped with the invention, to be loaded and the change over valve set for a load application of the brake and the several parts of the invention to be in their released positions, as shown in Fig. 1 of the drawings, the operations of the several parts are as follows:—The fluid pressure is admitted to the cylinder 1 which causes the piston, piston rod and levers 6 and 7 connected therewith, as well as the toothed member 12 to move to their empty brake applying positions, at which time fluid pressure, due to the action of the change over valve, is admitted to the cylinder 2 which causes the piston, piston rod 5 and the connected end of the lever 13 to move in the direction as indicated by the arrow C in Fig. 2. As the piston rod 5 is thus moved the opposite end of the lever 13 is moved in the direction of the arrow D in Fig. 2, and as this portion of the lever is so moved the member 17 is moved with it. As the member 17 moves with the end of the lever 13, the pressure on the arm 21 of the member 17 is relieved so that the spring 20 in the lever 13 will force the tooth 19 on the member 17 into engagement with the toothed member 12. After these toothed members, 12 and 17, are in engagement any further pressure on the piston rod 5 and lever 13 will be transmitted therefrom to the levers 7 and 6 and therethrough to the brake rods 8 and 9 and thence to the other usual brake parts.

When the fluid pressure is released from the cylinder 2 the spring 24, which has been compressed during the load application of the brakes, will force the piston, piston rod 5, lever 13 and member 17 to their released positions, as shown in Figs. 1 and 3.

Having thus described the invention what I claim as new and desire to secure by Letters Patent is:—

1. In an empty and load brake comprising an empty and a load cylinder, piston rods for said cylinders, a lever connected with one of said piston rods, a lever connected with the other of said piston rods, and toothed means for operatively connecting said levers only when a load application of the brake is being made.

2. In an empty and load brake comprising an empty and a load cylinder, piston rods for said cylinders, a plurality of levers fulcrumed intermediate their ends, the adjacent ends of said levers being adapted to be automatically connected and disconnected and the opposite end of each lever being operatively connected with one of said piston rods.

3. In an empty and load brake comprising an empty and a load cylinder, piston rods for said cylinders, a plurality of levers, one end of one of said levers being connected with one of said rods, and one end of the other of said levers being connected with the other of said rods, and means associated with the adjacent ends of said levers for automatically connecting and disconnecting said adjacent ends.

4. An empty and load brake comprising a plurality of power applying devices, levers between and connected with said devices, and means for automatically connecting and disconnecting said levers.

5. An empty and load brake comprising a plurality of power applying devices, levers operated by said devices and means for automatically connecting and disconnecting said levers.

6. An empty and load brake comprising a plurality of power applying devices, levers operated by said devices, and tooth means associated with the adjacent ends of said levers for automatically connecting and disconnecting said levers.

7. An empty and load brake comprising a power applying device for making an empty application of the brake, a power applying device for making a load application of the brake, a plurality of levers, one of said levers being connected with one of said devices, and the other of said levers being connected with the other of said devices, and means whereby said levers are connected together when a load application of the brake is being made and whereby a disconnection of said levers is effected when the brake is being released.

8. An empty and load brake comprising a power applying device for making an empty application of the brake, a lever connected with said power applying device, a power applying device for making a load application of the brake, a lever connected with the last mentioned power applying device, means for connecting said levers when the last mentioned power applying device is operated, and means whereby said connecting means are held in disconnected relation with each other when the first mentioned power applying device is operated.

9. An empty and load brake comprising a power applying device for making an empty application of the brakes, a lever connected with said device, a power applying device for making a load application of the brake, a lever connected with the last mentioned power applying device, a toothed member connected with the first mentioned lever, and adapted to pass through the last mentioned lever, and a toothed member on the last mentioned lever adapted to be moved into or out of engagement with the first mentioned toothed member to effect a connection or disconnection of said levers with each other.

10. An empty and load brake comprising empty and load brake applying devices, a plurality of levers connected with said devices and means whereby said levers are maintained disconnected from each other when said empty brake applying device is being operated, and whereby said levers are operatively connected together when said load brake applying device is being operated.

11. An empty and load brake comprising an empty brake applying device, a load brake applying device, a lever connected at one end with said empty brake applying device, a toothed member connected with the other end of said lever, a lever connected at one end with said load brake applying device, a toothed member mounted in the other end of the last mentioned lever, and means whereby the last mentioned toothed member is movable into or out of operative engagement with the first mentioned toothed member.

12. An empty and load brake comprising an empty brake applying device, a lever fulcrumed intermediate its ends and having one of its ends connected with said device, a load brake applying device, a lever fulcrumed intermediate its ends and having one of its ends connected with the last mentioned device, and means for automatically connecting and disconnecting the other ends of said levers.

13. In a railway car, an empty and load brake comprising an empty brake applying device, a load brake applying device, levers fulcrumed intermediate their ends to said car, one end of each of said levers being connected with one of said devices, interengaging members on the adjacent ends of said levers, a stop on said car, and an arm on one of said interengaging members adapted to engage said stop to hold said member out of engagement with the other of said members.

In testimony whereof I affix my signature.

BENJAMIN F. KURTZ.